United States Patent
Kato et al.

(10) Patent No.: US 6,708,818 B2
(45) Date of Patent: Mar. 23, 2004

(54) CROSSOVER CONVEYOR CHAIN DEVICE

(75) Inventors: Fukukazu Kato, Tokyo (JP); Tsuyoshi Nakamura, Tokyo (JP); Keiji Ohara, Tokyo (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 0 days.

(21) Appl. No.: 10/333,926

(22) PCT Filed: May 23, 2002

(86) PCT No.: PCT/JP02/04975
§ 371 (c)(1),
(2), (4) Date: Feb. 4, 2003

(87) PCT Pub. No.: WO03/002434
PCT Pub. Date: Jan. 9, 2003

(65) Prior Publication Data
US 2003/0168321 A1 Sep. 11, 2003

(30) Foreign Application Priority Data
Jun. 28, 2001 (JP) .................................. 2001-196001

(51) Int. Cl.⁷ .............................................. B65G 17/38
(52) U.S. Cl. ........................................ 198/853; 198/600
(58) Field of Search .............................. 198/600, 850, 198/851, 853

(56) References Cited

U.S. PATENT DOCUMENTS

| | | | |
|---|---|---|---|
| 5,125,504 A | 6/1992 | Corlett et al. | 198/850 |
| 5,217,110 A | 6/1993 | Spangler et al. | 198/853 X |
| 5,634,550 A | 6/1997 | Ensch et al. | 198/853 X |
| 5,850,902 A | * 12/1998 | Hicks et al. | 198/853 X |
| 6,471,047 B2 | * 10/2002 | Shibayama et al. | 198/853 X |

FOREIGN PATENT DOCUMENTS

| | | |
|---|---|---|
| JP | 6-211329 | 8/1994 |
| JP | 6-227633 | 8/1994 |
| JP | 8-239117 | 9/1996 |
| JP | 2001-261139 | 9/2001 |

OTHER PUBLICATIONS

English Language Abstract of JP Appln. No. 2001–261139.
English Language Abstract of JP Appln. No. 8–239117.
English Language Abstract of JP Appln. No. 6–227633.
English Language Abstract of JP Appln. No. 6–211329.

* cited by examiner

Primary Examiner—James R. Bidwell
(74) Attorney, Agent, or Firm—Greenblum & Bernstein, P.L.C.

(57) ABSTRACT

The crossover conveyor chain system includes a first conveyor chain (S1) and a second conveyor chain (S2) crossing the first conveyor chain (S1) to transfer the product from the first conveyor chain (S1) to the second conveyor chain (S2) while reorienting the product to a direction nearly perpendicular to that on the first conveyor chain (S1). The first conveyor chain (S1) is supported on an end bar (10) or a small-diameter sprocket, and the second conveyor chain (S2) is formed a plurality of chain unit pairs each including at least two types of chain units (A) different in length from each other and a coupling pin (B). Each of the chain units (A) has front convex portions (1) and front concave portions (3), disposed alternately at the front thereof, rear convex portions (2) and rear concave portions (4), disposed alternately at the back thereof, and a transfer overhanging portion (7) formed integrally at one lateral thereof. The transfer overhanging portion (7) has a beveled lower surface (8) formed on the lower side, at the free end, thereof and an inclined upper surface (9) formed on the upper side, at the free end, thereof. Because of this construction, the transfer overhanging portion (7) can be set short, and so it can be formed not easy to flex and break as well as to flex vertically, which assures to transfer the product stably and smoothly and prevent the load (weight) of the product from concentrating on a limited portion of the conveyor chain. Therefore, the crossover conveyor chain system is highly strong, rigid and durable, easy to be designed lightweight and compact, simple in construction, suitable for mass production, easy to assemble, easy to handle, and less expensive.

9 Claims, 7 Drawing Sheets

CROSSOVER CONVEYOR CHAIN DEVICE

BACKGROUND (a) Technical Field

The present invention generally relates to a crossover conveyor chain system including a first conveyor chain and a second conveyor chain which crosses the first conveyor chain, and more particularly to a crossover conveyor chain system capable of transferring the product more smoothly and stably from the first to the second conveyor chain while reorienting the product to a direction nearly perpendicular to that on the first conveyor chain, and which is more simple in construction, robust and less expensive.

(b) Background Art

Heretofore, various crossover conveyor chain systems have been proposed. One typical example is known from the Japanese Unexamined Application Publication No. 239117 of 1996 which discloses a mechanism for reorienting a product being transferred from one of two conveyors laid to cross each other to the other. The reorienting mechanism for a product to be transferred from one conveyor chain to the other includes a means whose cantilever-shaped second portion, onto which the product to be transferred from the first to second conveyor is once transferred, is removably attachable to the lateral side of a link module.

Disadvantageously, however, the aforementioned means is complicated in construction and difficult to assemble. Also, even if the end of the cantilever-shaped second portion is designed to be at the same level as the top of the first conveyor for smooth transfer of the product, the cantilever-shaped second portion can hardly transfer the product smoothly because it is easily bendable at the portion thereof attached to the link module, and it tips up the link by its load of levering or gouges the product at the free end thereof.

DISCLOSURE OF THE INVENTION

Accordingly, the present invention has an object to overcome the above-mentioned drawbacks of the background art by providing a crossover conveyor chain system simple in construction, highly strong and rigid, lightweight, suitable for mass production, easy to assemble, easy to handle, and less expensive.

The above object can be attained by providing a crossover conveyor chain system in which the product is transferred from a first conveyor chain (S1) to a second conveyor chain (S2) while reorienting the product to a direction nearly perpendicular to that on the first conveyor chain (S1), wherein:

the first conveyor chain (S1) is formed to have an end thereof adjacent to the second conveyor chain (S2) circumrotatably supported on an end bar (10) having a rounded edge whose radius of curvature is smaller or on a small-diameter sprocket;

the second conveyor chain (S2) includes at least two types of chain units (A) different in length from each other, and a long coupling pin (B) which couples the chain units A to each other in the conveying direction as well as in the width direction of the conveyor chain (S2);

the chain unit (A) including a plurality of front convex portions (1) and a plurality of front concave portions (3), disposed alternately at the front thereof, and a plurality of rear convex portions (2) and a plurality of rear concave portions (4), disposed alternately at the back thereof, and a transfer overhanging portion (7) formed integrally at one lateral thereof; and the transfer overhanging portion (7) having formed at the free end portion and at the bottom thereof a beveled surface (8) which is generally parallel to a trajectory delineated by the first conveyor chain (S1) when moving along the upper edge of the end bar (10) and also formed at the free end portion and at the top thereof an inclined surface (9) which gradually descends as it goes toward the outer end thereof.

In the above crossover conveyor chain system according to the present invention, since the transfer overhanging portion (7) positioned obliquely above an end, adjacent to the second conveyor chain (S2), of the first conveyor chain (S1) can be set to have a short length (overhang length), it can be formed not easy to flex and break. Thus, the transfer overhanging portion (7) can easily be improved in strength and durability. Thus, the moment developed to the chain unit (A) when a weight of the product is applied to the end of the transfer overhanging portion (7) can be minimized and the chain unit (A) itself will not possibly be lifted and inclined. Therefore, the product can be transferred smoothly without being overturned.

Since the transfer overhanging portion (7) having formed at the free end portion and at the bottom thereof a beveled surface (8) which is generally parallel to a trajectory delineated by the first conveyor chain (S1) when moving along the turn-around end thereof and also formed at the free end portion and at the top thereof an inclined surface (9) which gradually descends as it goes toward the outer end thereof, the beveled lower surface (8) permits the transfer overhanging portion (7) to easily be located nearer to the first conveyor chain (S1) and the upper inclined surface (9) permits to transfer the product more smoothly from the first conveyor chain (S1) to the second chain conveyor (S2).

Since the second conveyor chain (S2) includes at least two types of chain units (A) different in length from each other, and a long coupling pin (B) which couples the chain units A to each other in the conveying direction as well as in the width direction of the conveyor chain (S2) and the chain unit (A) has the plurality of front convex portions (1) and plurality of front concave portions (3), disposed alternately at the front thereof, and the plurality of rear convex portions (2) and plurality of rear concave portions (4), disposed alternately at the back thereof, the connections between the chain units (A) will not be in line with each other in the conveying direction and thus the load (weight) of the product on the conveyor chain will not easily concentrate on a limited portion of the conveyor chain and will be difficult to flex vertically under the weight of the product being transported.

In addition, since the transfer overhanging portion (7) is formed integrally with the chain unit (A), so it will have an improved strength, rigidity, durability, etc., which assures a stable transfer of any product which is relatively heavy. Also, the second conveyor chain (S2) itself can be simple in construction, suitable for mass production and less expansive.

Thus, according to the present invention, the crossover conveyor chain system is highly strong and rigid, easy to be designed lightweight and compact, simple in construction, suitable for mass production, easy to assemble, easy to handle, and less expensive.

In the crossover conveyor chain system according to the present invention, it is desirable that support rails (11) should be provided which can be located near the first conveyor chain (S1) and support at the top thereof the second conveyor chain (S2) at one of the lateral lower side and the chain unit (A) should have formed thereon a guide projection (6) which is in sliding contact with the other lateral side of the support rail (11). Also, the second conveyor chain (S2) is supported on a support rail (12) at the central bottom portion thereof and on another support rail (6) at the other lateral lower side thereof. The chain unit (A) has further guide projections (6) which are in sliding contact with the opposite lateral sides, respectively, of the support rail (11).

Because of the above construction of the crossover conveyor chain system, the second conveyor chain (S2) can stably be supported on the support rails (11) at the lateral sides thereof and on the support rail (12) at the central portion thereof. So, the chain unit (A) of the second conveyor chain (S2) can be prevented from being lifted and inclined.

In addition, the guide projections (6) prevent the second conveyor chain (S2) from being laterally deflected to positively prevent the second conveyor chain (S2) from touching the first conveyor chain (S1). Also, the guide projections (6) can maintain a small space between the second and first conveyor chains (S2 and S1).

Also, in the crossover conveyor chain system according to the present invention, the second conveyor chains (S2) should desirably be formed from the chain units (A) different in length from each other and alternately disposed in the conveying direction, whereby it is possible to positively prevent the width-directional connections between the chain units (A) in pair from being in line with each other, the load (weight) of the product on the conveyor chain from concentrating on a limited portion of the conveyor chain, and make the conveyor chain difficult to flex vertically under the weight of the product being transported.

In addition, in the crossover conveyor chain system according to the present invention, it is desirable that the front convex portion (1) or rear convex portion (2), contiguous to the transfer overhanging portion (7), of the chain unit (A) in the second conveyor chain (S2) should partially cut to be generally parallel with the trajectory delineated by the first conveyor chain (S1) when moving along the turn-around end thereof.

Because of the above construction, the front convex portion (1) or rear convex portion (2) contiguous to the transfer overhanging portion (7) can be located nearer to the end, adjacent to the second conveyor chain (S2), of the first conveyor chain (S1) and thus can be set to have a short length (overhang length). Therefore, the transfer overhanging portion (7) can be formed not easy to flex and break. Thus, the transfer overhanging portion (7) can be improved in strength and durability.

Further, the moment developed to the chain unit (A) when a weight of the product is applied to the end of the transfer overhanging portion (7) can be minimized so that the chain unit (A) will not possibly be lifted and inclined and thus the product can be transferred more stably and smoothly without being overturned.

BEST MODE FOR CARRYING OUT THE INVENTION

The embodiments of the crossover conveyor chain system according to the present invention will be described with reference to the accompanying drawings.

Figure 6:
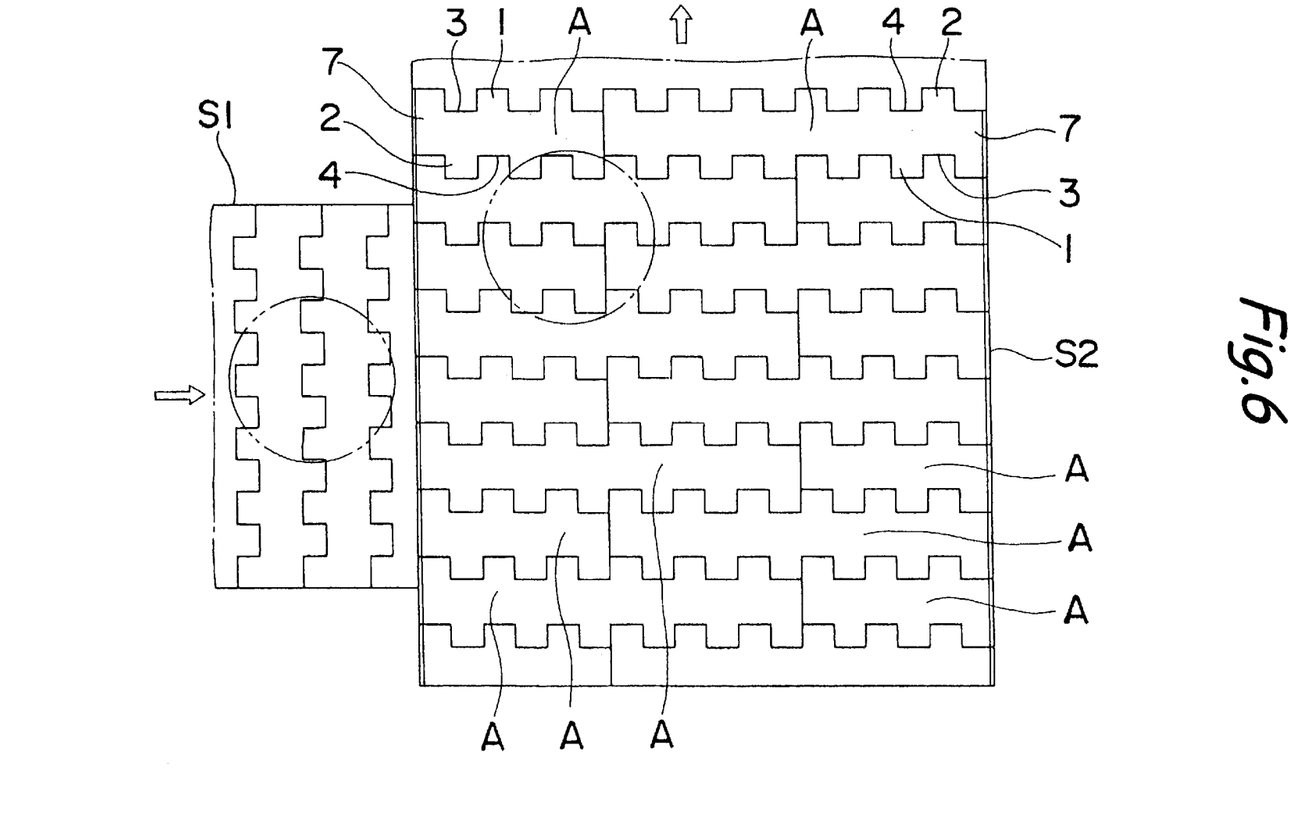
FIG. 6 is a partial plan view of the crossover conveyor chain system.

As shown in FIG. 6, the crossover conveyor chain system according to the present invention includes a first conveyor chains S1 and a second conveyor chain S2 crossing the first conveyor chain S2 to transfer the products from the first conveyor chain S1 to the second conveyor chain S2 and change the conveying direction of the product by about a right angle.

Figure 5:
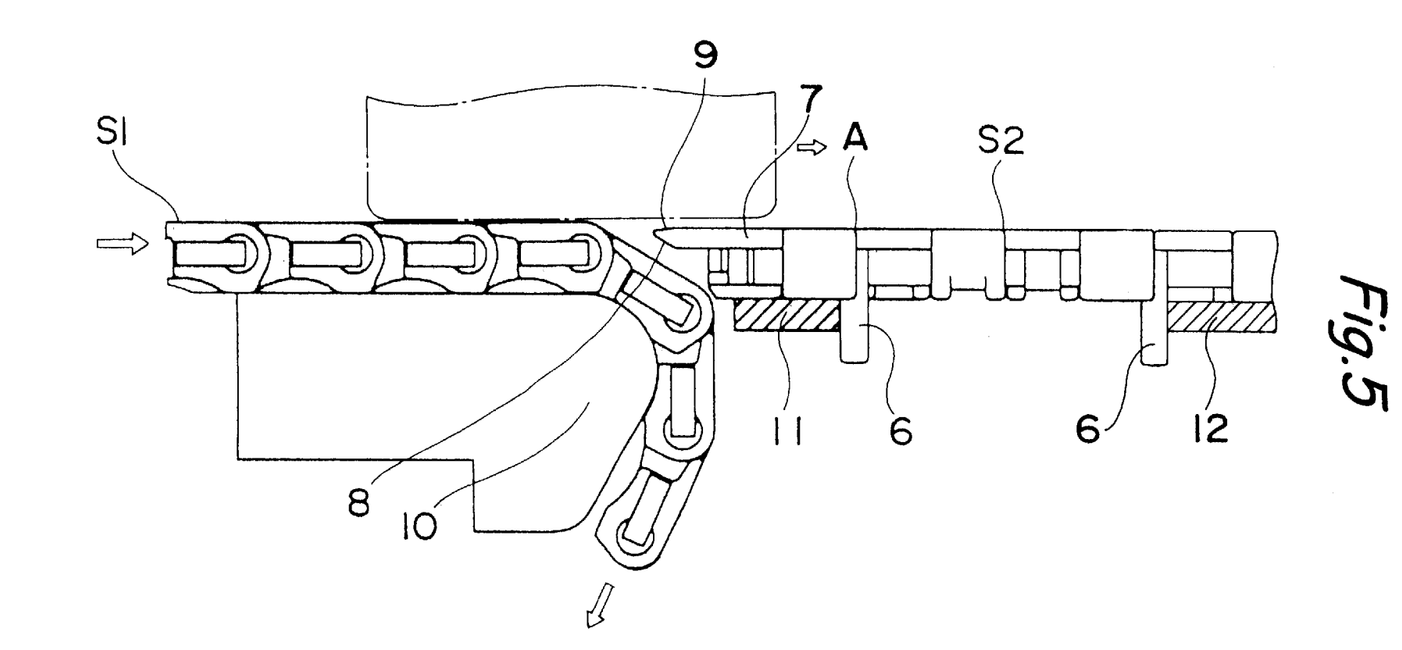
FIG. 5 is a partial cut-away front view of the crossover conveyor chain system.

In the crossover conveyor chain system, the end of the first conveyor chain S1, adjacent to the second conveyor chain S1 is supported circumrotatably on a rounded edge, having a small radius of curvature, of an end bar 10 as shown in FIG. 5.

More particularly, the end bar 10 is formed so that a preceding one of two chain units on the rounded edge of the end bar 10 can be turned largely about a coupling pin through the chain units obliquely downward in relation to the chain unit next to the former one. So, the end bar 10 is shaped so that the length of a transfer overhanging portion 7 disposed obliquely above the end of the first conveyor chain S1, adjacent to the second conveyor chain S2, can be set short. The transfer overhanging portion 7 will be described in detail later. However, the transfer overhanging portion 7 itself is not easy to flex and break since it is formed short.

Note that the end of the first conveyor chain S1, adjacent to the second conveyor chain S2, may be designed to be supported circumrotatably on a small-diameter sprocket (not shown) in place of the end bar 10.

Also, the construction, shape, dimensions and material of the first conveyor chain S1 and the construction, shape, dimensions, material, position, etc. of the end member 10 are not limited to those illustrated and described herein but may be set or modified appropriately without departing from the scope and spirit of the of the present invention, defined in the claims given later.

The second conveyor chain S2 included in the crossover conveyor chain system according to the present invention is a series of chain unit pairs each including at least two types of chain units A (it should be noted here that the chain unit is generally referred to with the reference A but the two types of chain units will also be referred to with references A1 and A2, respectively, as in the illustrations wherever appropriate) formed from a synthetic resin to have different lengths in the width direction thereof, and a coupling pin B formed from a synthetic resin to couple the chain units A1 and A2 in pair to each other in the width direction and the pairs of chain units A1 and A2 to each other in the conveying direction.

Figure 1:
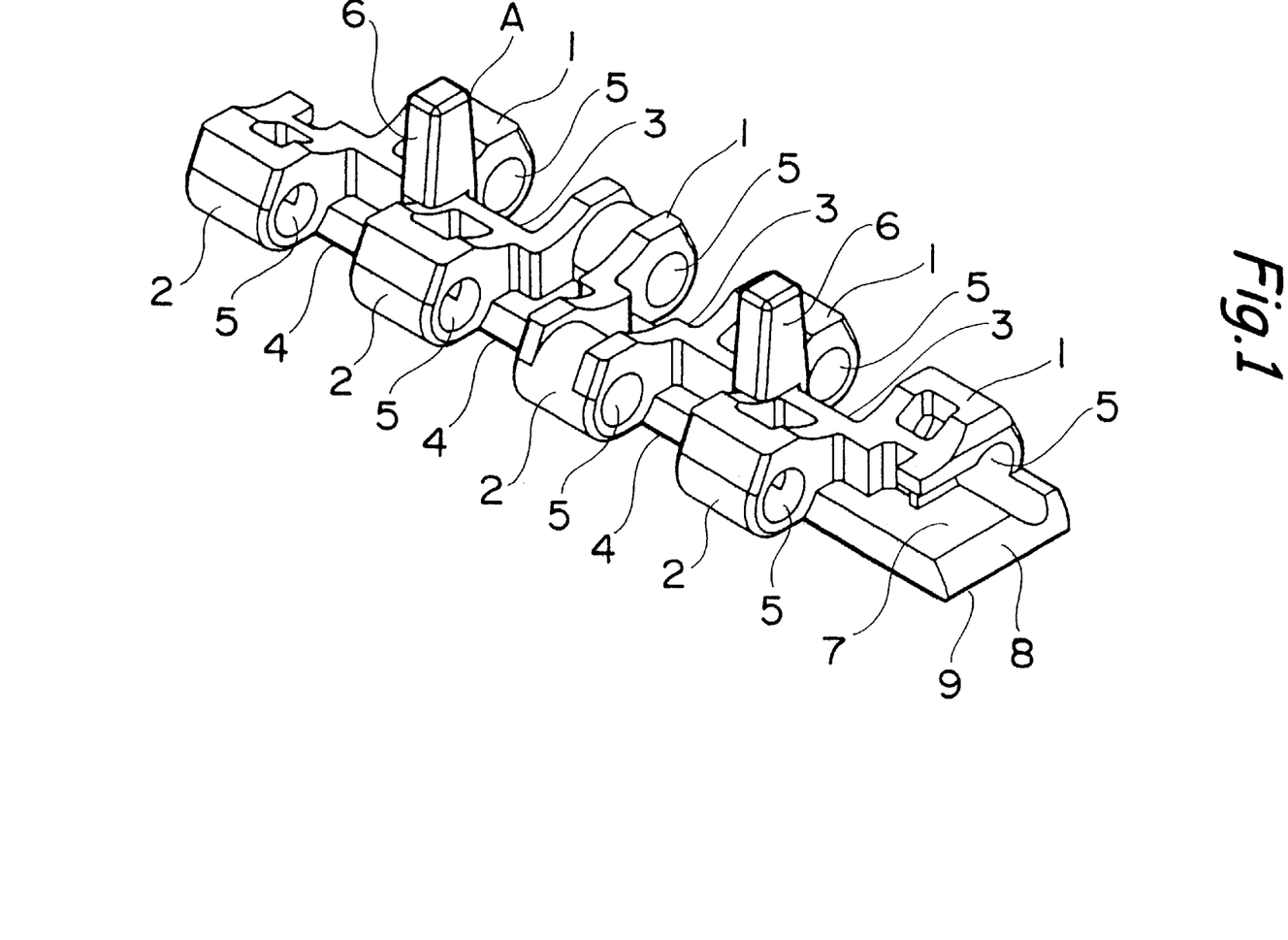
FIG. 1 is a perspective view, from below, of the chain units included in the second conveyor chain in one embodiment of the crossover conveyor chain system according to the present invention.
Figure 2:
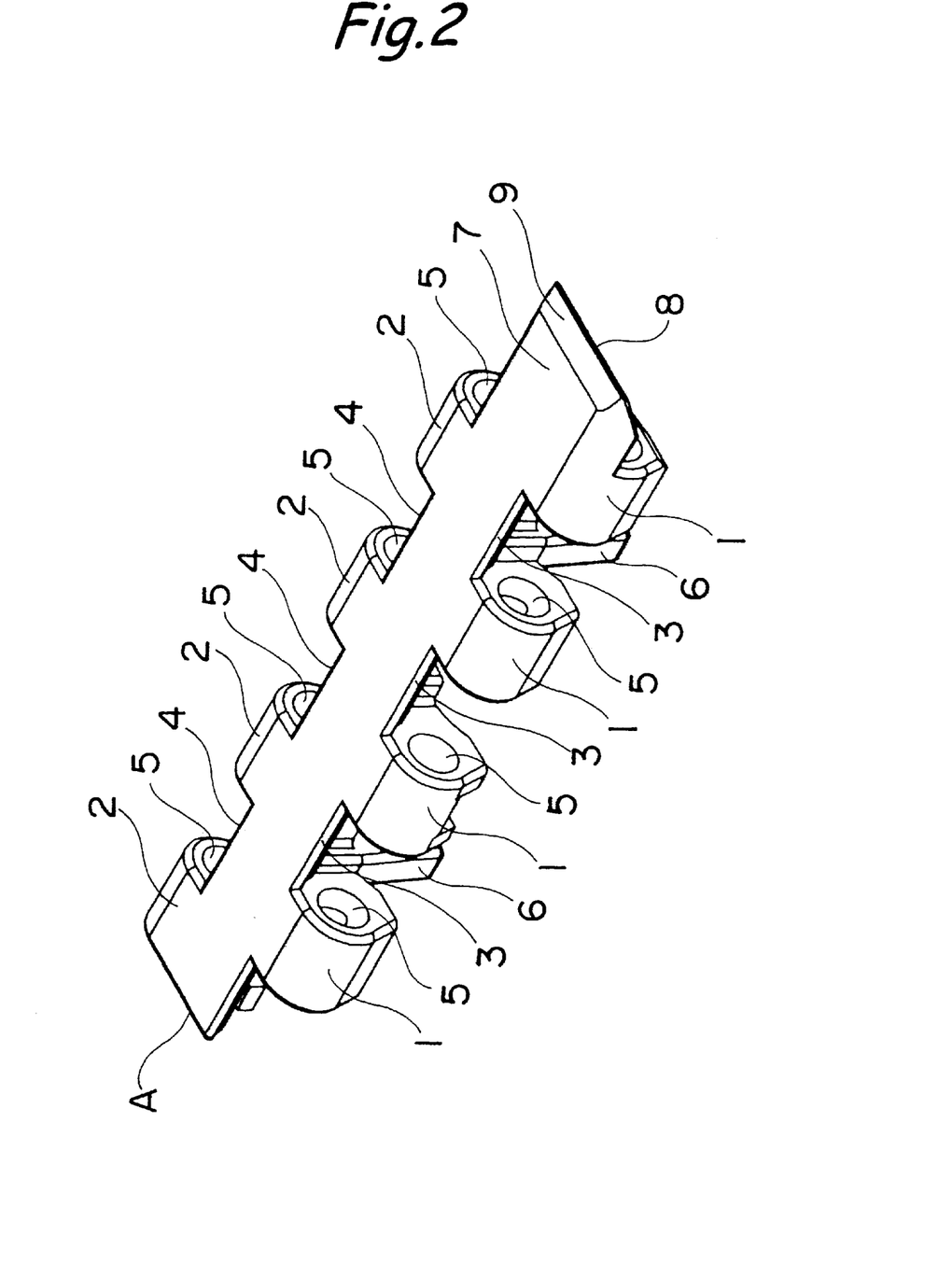
FIG. 2 is a perspective view, from above, of the chain units included in the second chain in the crossover conveyor chain system.
Figure 3:
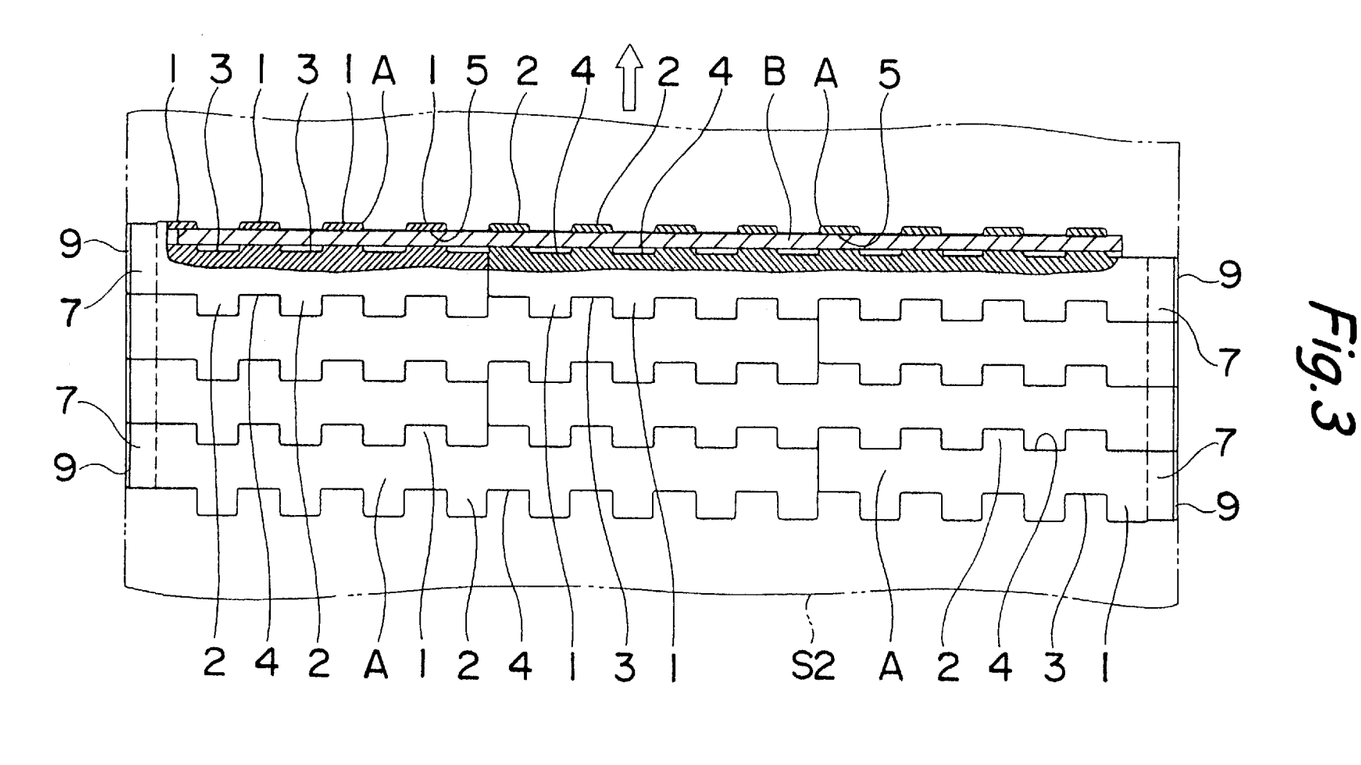
FIG. 3 is a partially cut-away plan view of the second conveyor chain in the crossover conveyor chain system.
Figure 4:
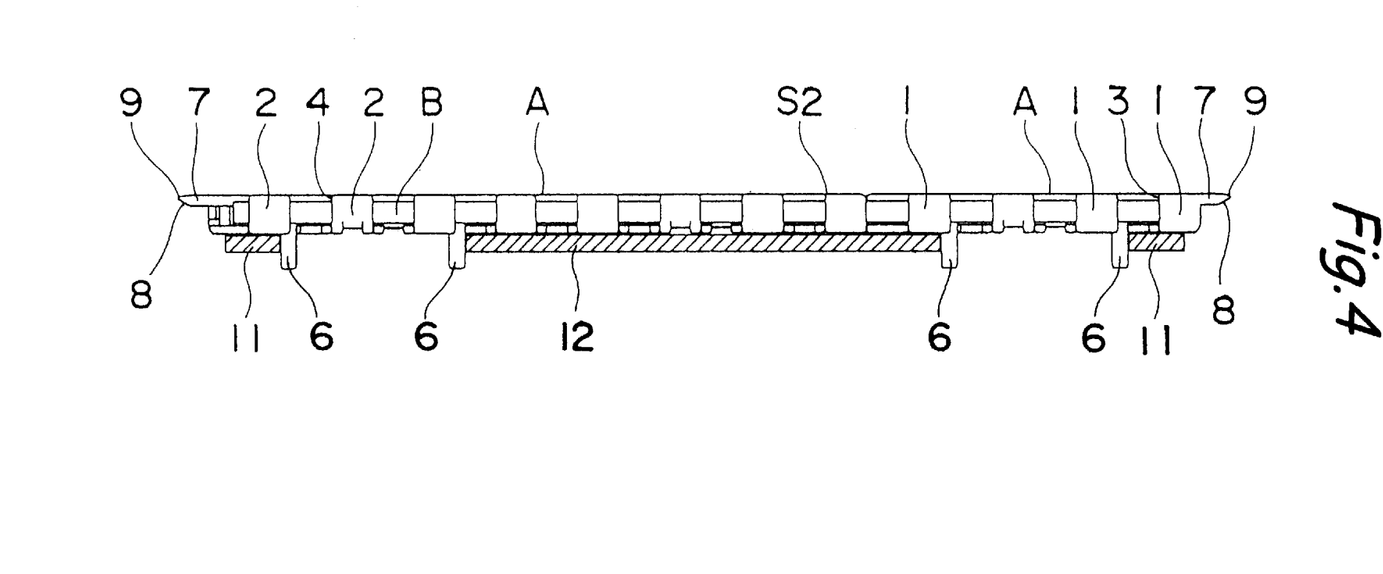
FIG. 4 is a front view of the second conveyor chain in the crossover conveyor chain system.

That is, the second conveyor chain S2 can be constructed in the form of an endless belt having a desired width by coupling the two types of chain units A1 and A2 to each other by the coupling pin B in the conveying direction and width direction as shown in FIGS. 3 and 6.

Note that the chain units A1 and A2 and coupling pin B may be formed from an appropriate metallic or composite material and the construction, shape, dimensions, material, position, etc. of the second conveyor chain S2 are not limited those illustrated and described herein but may be set or modified appropriately without departing the scope and spirit of the present invention, defined in the claims which given later.

In each of the conveyor chains S1 and S2, the two types of chain units A1 and A2 different in length from each other are linearly coupled to each other in the width direction, and alternately coupled to each other in the conveying direction. That is, the chain unit pairs are laid coupled to each other so that the width-directional connections between the chain units A1 and A2 will not be in line with each other. This is intended for preventing the load (weight) of the product on the conveyor chain from concentrating on a limited portion of the conveyor chain as well as for making the conveyor chain difficult to flex vertically under the weight of the product being transported.

In addition, the two types of chain units A1 and A2 form together a pair in which one of the chain units (A1, for example) is positioned at one lateral side of the conveyor chain S2 while the other (A2) is positioned at the other lateral side. When the chain unit pair is turned end for end (180 degrees), the one of the chain units (A1, for example) will come to the other lateral side of the conveyor chain S2 while the other (A2) will come to the one lateral side. That is, it will suffice to produce only the two types of chain units A1 and A2 pre-manufactured in advance for construction of a conveyor chain. They can easily be coupled to each other to form a pair and the chain unit pairs thus obtained can easily be assembled into the conveyor chain S2 by coupling them to each other. The conveyor chain S2 thus constructed is less expensive.

The chain unit A has a plurality of front convex portions 1 and a plurality of front concave portions 3, disposed alternately at the front thereof, and a plurality of rear convex portions 2 and a plurality of rear concave portions 4, disposed alternately at the back thereof. As shown, each of the front and rear convex portions 1 and 2 has formed through it a through-hole 5 through which a coupling pin B is penetrated. Also, the transfer overhanging portion 7 is formed integrally at one end of the chain unit A (namely, one lateral edge of the conveyor chain).

That is, in the conveyor chain, two chain units A adjacent to each other in the conveying direction are in such a relation that the anterior two chain unit A has received in the rear concave portion 4 thereof the front convex portion 1 of the posterior chain unit A, and the rear convex portion 2 thereof received in the front concave portion 3 of the posterior chain unit A.

Note that since in the conveyor chain, a chain unit pair in which the chain unit A1 is at one lateral side of the conveyor chain S2 while the chain unit A2 is at the other lateral side, for example, is followed by another chain unit pair turned end for end (180 degrees) and in which the chain unit A1 is thus at the other lateral side of the conveyor chain S2 and the chain unit A2 is at the one lateral side, so the front convex portions 1 and front concave portions 3 will be directed forward in the conveying direction and the rear convex portions 2 and rear concave portions 4 will be directed rearward.

Further, the transfer overhanging portion 7 is beveled (as indicated at a reference 8) at the free end portion and at the bottom thereof to be generally parallel to a trajectory delineated by the first conveyor chain S1 when moving along the turn-around end thereof (at the upper edge of the end bar 10). That is to say, the beveled lower surface 8 permits the transfer overhanging portion 7 to easily be located near the first conveyor chain S1 and thus the transfer overhanging portion 7 itself to be shorter for a smaller space in relation to the first conveyor chain S1.

In addition, the front convex portion 1 or rear convex portion 2, contiguous to the transfer overhanging portion 7, of the chain unit A is partially cut to be generally parallel with the trajectory delineated by the first conveyor chain S1 when moving along the turn-around end thereof (the upper edge of the end bar 10). That is to say, this cutting permits the front convex portion 1 or rear convex portion 2 contiguous to the transfer overhanging portion 7 to easily be located nearer to the end, adjacent to the second conveyor chain S2, of the first conveyor chain S1 and thus the transfer overhanging portion 7 itself to be formed smaller in overhanging length. Thus, the moment developed to the chain unit A when a weight of the product is applied to the end of the transfer overhanging portion 7 can be minimized and the chain unit A itself will not be lifted and inclined.

Also, the transfer overhanging portion 7 has formed at the free end portion and at the top thereof an inclined surface 9 which gradually descends as it goes toward the outer end thereof.

The above inclined upper surface 9 is intended for preventing the product being transferred from the first conveyor chain S1 onto the second conveyor chain S2 from butting the end of the transfer overhanging portion 7. Namely, the inclined upper surface 9 assures a smoother transfer of the product.

Note that the inclined upper surface 9 is set lower than the carrying surface of the first conveyor chain S1. The carrying surface of the second conveyor chain S2 is set to the same level as, or slightly lower than, that of the first conveyor chain S1 for a smooth transfer of the product without butting the transfer overhanging portion 7 of the second conveyor chain S2.

Further, the chain unit A has formed on the bottom thereof guide projections 6 which are in sliding contact with the lateral sides of support rails 11 and 12 which will be described in detail later to prevent the second conveyor chain S2 from moving toward the first conveyor chain S1 into contact with the latter.

That is, the guide projections 6 maintain a small space between the second and first conveyor chains S2 and S1 as shown in FIG. 5.

The support rails 11 and 12 are disposed in positions near and way from the first conveyor chain S1 and in an intermediate position between the near and way-off positions, respectively, to support, on the tops thereof, the lateral lower sides and middle lower side, respectively, of the second conveyor chain S2.

Namely, the second conveyor chain S2 is stably supported at the lateral lower portions and intermediate lower portion thereof on the support rails 11 and 12, respectively, to prevent the chain units A from being lifted and inclined.

Figure 7:
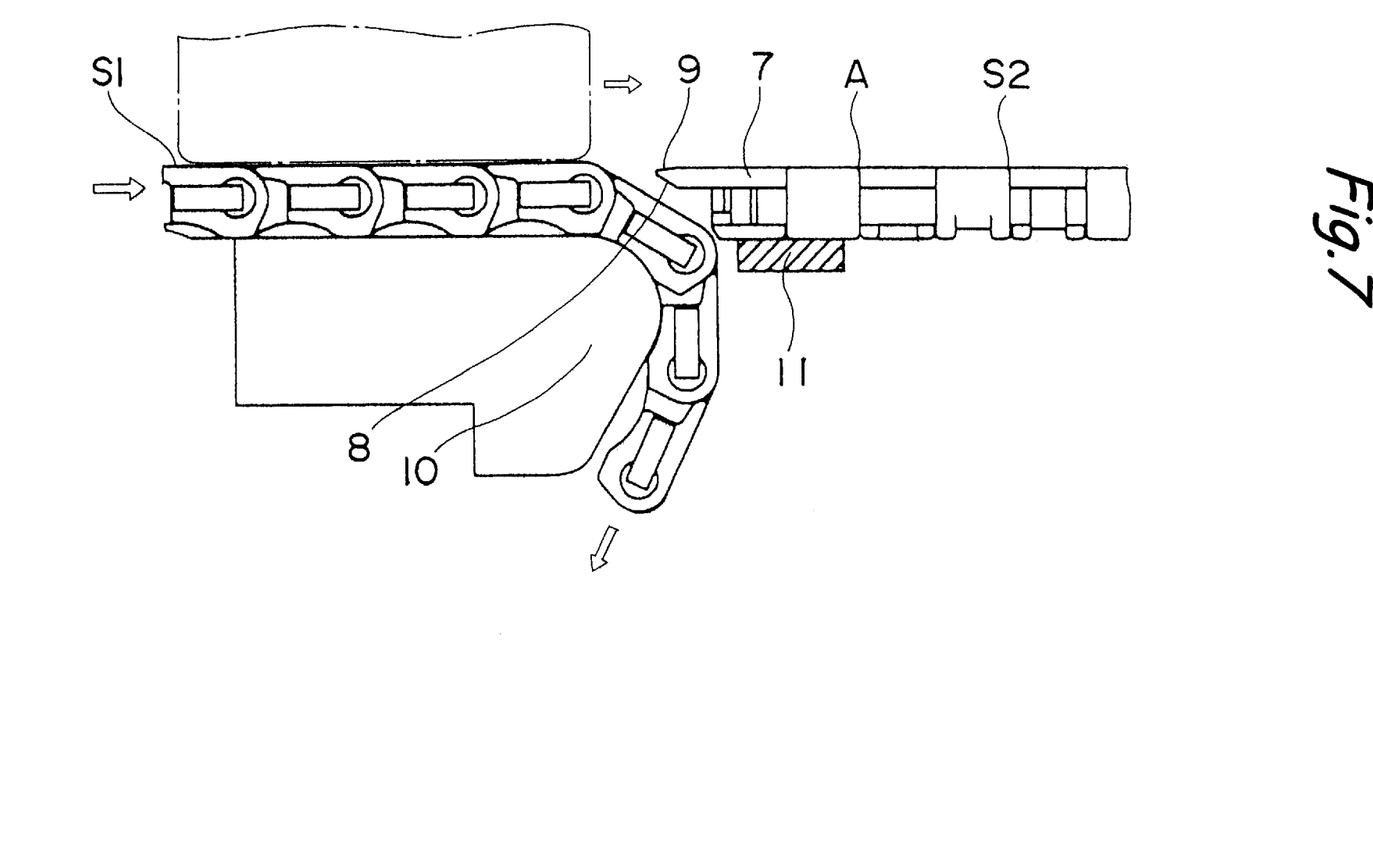
FIG. 7 is a partially cut-away front view of another embodiment of the crossover conveyor chain system according to the present invention.

Note that the aforementioned guide projections 6 may not be provided on the bottom of the chain unit A (as shown in FIG. 7). Namely, in case the first conveyor chain S1 is constructed to stably run without any flexing in the width direction, the guide projections 6 are not required.

Note here that the construction, shape, dimensions, material and type of the chain unit A, construction, shape, dimensions, quantity and position of the front convex portion 1, construction, shape, dimensions, quantity and position of the rear convex portion 2, construction, shape, dimensions, quantity and position of the front concave portion 3, construction, shape, dimensions, quantity and position of the rear concave portion 4, construction, shape, dimensions, quantity and position of the coupling-pin through-hole 5, construction, shape, dimensions, material, quantity and position of the guide projection 6, construction, shape, dimensions and position of the transfer overhanging portion 7, construction, shape and dimensions of the beveled lower surface 8, construction, shape and dimensions of the inclined upper surface 9, construction, shape, dimensions and material of the coupling pin B, and the construction, shape, dimensions, material, quality and position of the support rails 11 and 12 are not limited to those having been illustrated and described herein but may be appropriately set for modified without departing the scope and spirit of the present invention, defined in the claims given later.

Industrial Applicability

As having been described in the foregoing, the present invention can solve the problem of the conventional crossover conveyor chain system that it is difficult to smoothly transfer the product from the first conveyor chain S1 to the second conveyor chain S2 by providing the crossover conveyor chain system which is simple in construction, highly strong and rigid, lightweight, suitable for mass production, easy to assemble, easy to handle, and less expensive. Also for a conveyor line for products such as beverage, foods, pharmaceutical goods and the like, the crossover conveyor chain system according to the present invention is much contributed to space saving and freer conveyor-line designing. Thus the crossover conveyor chain system according to the present invention is suitably applicable to various types of conveyor lines.

What is claimed is:

1. A crossover conveyor chain system in which the product is transferred from a first conveyor chain to a second conveyor chain while reorienting the product to a direction nearly perpendicular to that on the first conveyor chain, wherein:

the first conveyor chain is formed to have an end thereof adjacent to the second conveyor chain circumrotatably supported on an end bar having a rounded edge;

the second conveyor chain includes at least two types of chain units different in length from each other, and a long coupling pin which couples the chain units to each other in the conveying direction as well as in the width direction of the conveyor chain;

each of said two types of chain units including a plurality of front convex portions and a plurality of front concave portions, disposed alternately at the front thereof, and a plurality of rear convex portions and a plurality of rear concave portions, disposed alternately at the back thereof, and a transfer overhanging portion formed integrally at one lateral side thereof;

said two types of chain units including a first type of chain unit and a second type of chain unit, one of said first type of chain unit and one of said second type of chain unit together forming the width of the second conveyor chain in which both said one of said first type of chain unit and said one of said second type of chain unit form the edges in said conveying direction of said second conveyor; and the transfer overhanging portion having formed at the free end portion and at the bottom thereof a beveled surface which is generally parallel to a trajectory delineated by the first conveyor chain when moving along the turn-around end thereof and also formed at the free end portion and at the top thereof an inclined surface which gradually descends as it goes toward the outer end thereof.

2. The system as set forth in claim 1, further comprising:

support rails to be located near the first conveyor chain and which are formed to support at the top thereof the second conveyor chain at a lower side thereof; and guide projections which are in sliding contact with lateral sides of the support rails.

3. The system as set forth in claim 1, wherein the second conveyor chain is formed from chain unit pairs, each chain unit pair formed of chain units which are different in length from each other and alternately disposed in the conveying direction.

4. The system as set forth in claim 1, wherein the front convex portion or rear convex portion, contiguous to the transfer overhanging portion, of the chain unit in the second conveyor chain is partially cut to be generally parallel with the trajectory delineated by the first conveyor chain when moving along the turn-around thereof.

5. The system as set forth in claim 2, wherein the second conveyor chain is formed from chain unit pairs, each chain unit pair formed of chain units which are different in length from each other and alternately disposed in the conveying direction.

6. The system as set forth in claim 2, wherein the front convex portion or rear convex portion, contiguous to the transfer overhanging portion, of the chain unit in the second conveyor chain is partially cut to be generally parallel with the trajectory delineated by the first conveyor chain when moving along the turn-around thereof.

7. The system as set forth in claim 3, wherein the front convex portion or rear convex portion, contiguous to the transfer overhanging portion, of the chain unit in the second conveyor chain is partially cut to be generally parallel with the trajectory delineated by the first conveyor chain when moving along the turn-around thereof.

8. The system as set forth in claim 5, wherein the front convex portion or rear convex portion, contiguous to the transfer overhanging portion, of the chain unit in the second conveyor chain is partially cut to be generally parallel with the trajectory delineated by the first conveyor chain when moving along the turn-around thereof.

9. The system as set forth in claim 1, said two types of chain units further comprising guide rails extending from a lower surface thereof, and in which said two types of chain units are configured so that either one of said first type of chain unit or one of said second type of chain unit may be positioned adjacent said first conveyor.

* * * * *